INVENTOR
BROTHER BERARD MATZENAUER
BY Kenyon & Kenyon
ATTORNEYS

INVENTOR
BROTHER BERARD MATZENAUER

INVENTOR
BROTHER BERARD MATZENAUER
BY *Kenyon & Kenyon*
ATTORNEYS

Jan. 18, 1966  B. B. MATZENAUER  3,229,613
ELECTRIC TOASTER

Filed May 15, 1963  6 Sheets-Sheet 6

INVENTOR
BROTHER BERARD MATZENAUER
BY Kenyon & Kenyon
ATTORNEYS

United States Patent Office 3,229,613
Patented Jan. 18, 1966

3,229,613
ELECTRIC TOASTER
Berard Matzenauer, 174 Ramsey St.,
Paterson 1, N.J.
Filed May 15, 1963, Ser. No. 280,605
18 Claims. (Cl. 99—327)

This invention relates to an electric toaster. It relates particularly to an electric toaster which is capable of toasting a large number of slices of bread simultaneously. It relates more particularly to an electric toaster of the kind described which discharges slices of toasted bread downwardly, that is, through its bottom. It relates still more particularly to such an electric toaster having top and bottom covers for its heating element assembly both installed and equipped for at least semi-automatic operation to facilitate the loading of bread and the discharging of toast, and it relates even still more particularly to an electric toaster having the foregoing components and characteristics which is adapted to cooperate with a toast basket by automatically discharging slices of toasted bread into the same at the end of the toasting period.

It is an object of the present invention to provide an electric toaster having a slotted, sidewise-shiftable top cover for its heating element assembly, this cover being held normally in open or bread loading position by spring action, and being shifted into closed or bread toasting position by solenoid action at the start of the toasting period.

It is another object of the present invention to provide an electric toaster having a heating element assembly and a slotted, sidewise-shiftable bottom cover therefor, this assembly and its bottom cover being sufficiently elevated in and by the overall toaster framework that a space is provided below the bottom cover for a toast-receiving basket into which a plurality of toast slices may drop simultaneously upon the bottom cover being shifted into toast discharging position.

It is another object of the present invention to provide a toast-receiving basket cooperable with a toaster of the kind just described and which includes a cover or lid which is automatically moved into open attitude when the basket is put in receiving position below the bottom cover of the toaster heating element assembly, and automatically moved into closed attitude when the basket is withdrawn from the toaster.

It is another object of the present invention to provide an electric toaster having a heating element assembly and a bottom cover therefor which is shiftable into open or toast discharging position by solenoid action upon completion of the toasting period, and having further an electric circuit for its heating elements and bottom cover solenoid which is closed with respect to the heating elements and open with respect to the solenoid during a toasting period of regulated duration, and thereafter open with respect to the heating elements and closed with respect to the solenoid for a determinate period to give the slices of toast adequate opportunity to be discharged.

It is another object of the present invention to provide an electric toaster having a heating element assembly and a top cover therefor which is shiftable into closed or bread toasting position by solenoid action simultaneously with the closing of the electric circuit for the heating elements, and which is not releasable to open or bread loading position until after the discharge of the slices of toast following the opening of the heating element circuit.

It is another object of the present invention to provide an electric toaster having a heating element and both top and bottom covers therefor which are shiftable by solenoid action according to the two last-stated objects.

These and other objects of the present invention as well as its advantages, nature, and substance will be more clearly perceived and fully understood by referring to the following description and claims taken in connection with the accompanying drawings in which:

Figure 1:
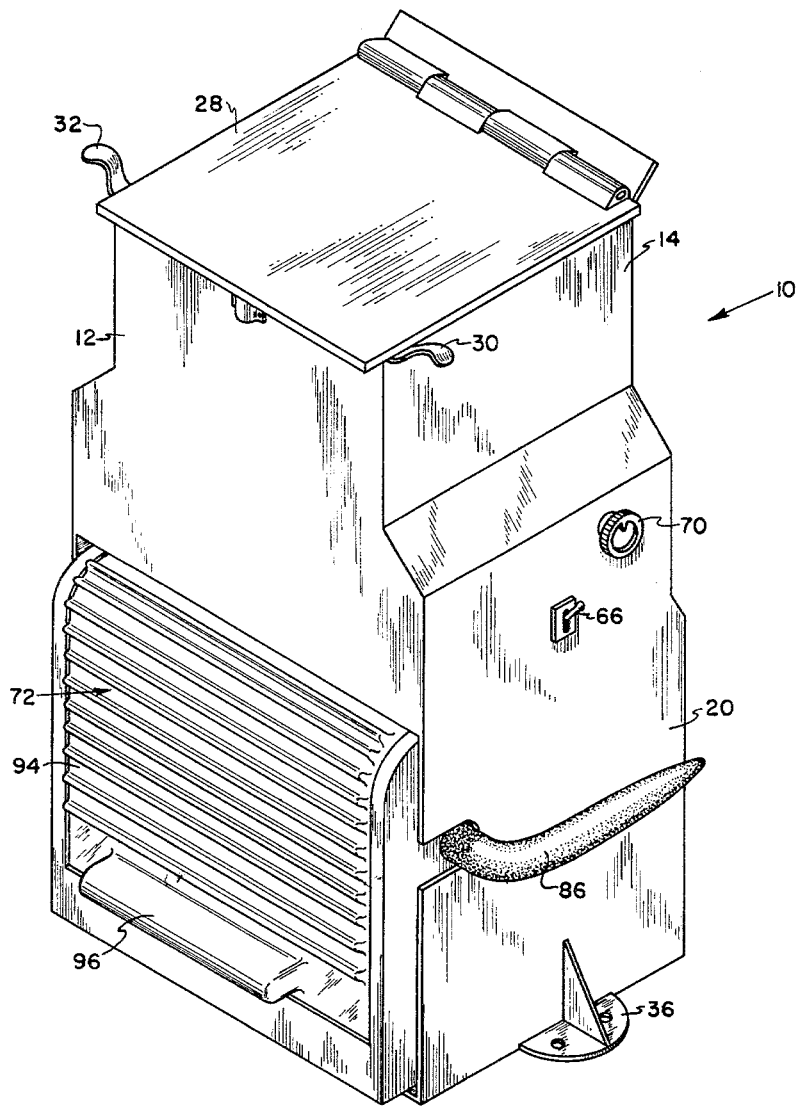
FIG. 1 represents an isometric view of the exterior of one embodiment of the electric toaster of this invention.

Referring now to the drawings in detail, especially FIGS. 1, 2, 3 and 4 thereof, one embodiment of the electric toaster of this invention is generally designated 10. Toaster 10 has a structural casing comprising an upper front panel 12, upper side panels 14 and 16, upper back panel 18, lower side panels 20 and 22, lower back panel 24, and bottom panel 26. It is provided with a top cover or lid 28 which is hinged to a slanting upper portion of upper back panel 18 and which in lowered position seats in essentially gap-free relation on and along the upper edges of panels 12, 14 and 16. Lid 28 has lifting handles 30 and 32 on its lateral edges. Panels 12, 14, 16 and 18 and lid 28 are internally insulated with suitable sheet-like material such as asbestos sheet. A layer of this material on the under side of lid 28 is designated 34. In a more elaborate form of construction, metal sheathing may be applied inside of the insulation. Securing brackets 36 and 38 are provided at the bottom of the toaster for use when it is to be more or less permanently fastened in place on, for example, a table top or kitchen counter.

Within the upper portion of the toaster casing defined by panels 12, 14, 16 and 18 are a pluraliy of heating elements 40 in the form of grids of wire of appropriate resistance. These elements which are of generally rectangular overall shape are supported between upper front and upper back panels 12 and 18 by means of brackets 42. Enclosing the heating elements individually are a plurality of spacer guides 44. These guides are peaked at their upper ends and of grid-like configuration in their side portions, and are mounted to the upper front and upper back panels of the toaster casing. They serve to separate the toasting slices of bread 46 one from another and provide them with extensive two-side exposure to the heating elemetns. Their horizontal elements 45 slant inwardly and downwardly as heat deflectors.

While in toasting position, bread slices 46 are supported on the slat portions of a slotted plate 48 constituting a bottom cover for the plurality of heating elements or heating element assembly. Plate 48 itself is supported through rotatable connections with and from bell crank levers 50 and 52 whose pivot shafts 54 and 56 are mounted in the toaster casing. The end of lever 50 distant from the lever's connection to plate 48 is attached through a tension spring 58 to a spring post 60 mounted on and within the toaster casing. The end of lever 52 distant from the lever's connection to plate 48 is rotatably connected to the lower end of the plunger element of an electric solenoid 62, the coil element of which is rotatably mounted in the toaster casing.

Figure 2:
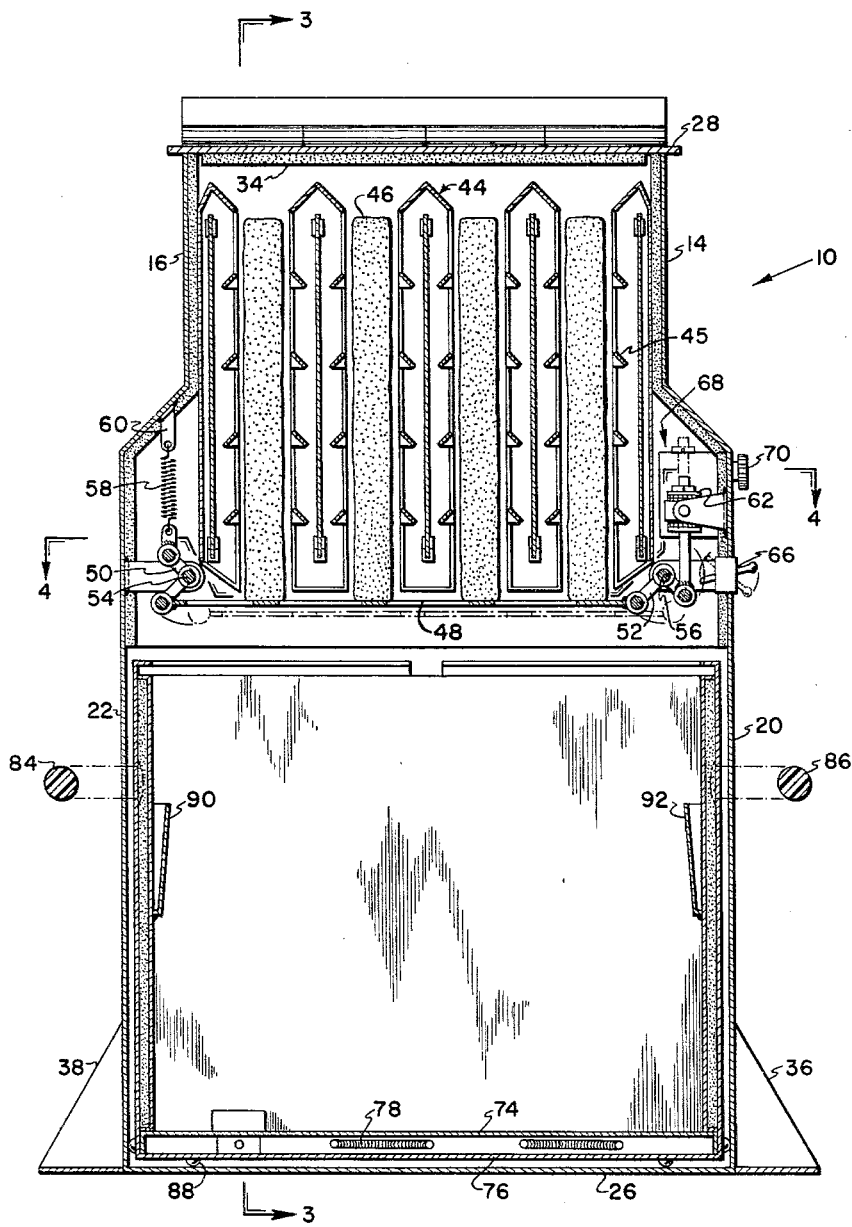
FIG. 2 represents a view in front sectional elevation of the electric toaster of FIG. 1 taken along line 2—2 in FIG. 3 looking in the direction of the arrows, the toaster being loaded with a plurality of slices of bread in toasting position.

When there is no current flowing in the coil element of solenoid 62, the pull of spring 58 holds slotted plate or heating element assembly bottom cover 48 in its slotted position shown in solid outline in FIG. 2, that is, with its portions in between spacer guides 44 to support slices of bread 46 in toasting position. When there is current flowing in the coil element of solenoid 62, that is, when the solenoid is energized, the solenoid plunger element is drawn upwardly, and slotted plate 48 is shifted to the right against the pull of spring 58 beyond the intermediate position in which it is shown in dashed outline in FIG. 2. When the heating element assembly bottom cover is fully to the right its slots or open regions are in between spacer guides 44, and toast or bread slices originally held in toasting position between the spacer guides on the slats of plate 48 can drop through the slots in the plate for discharge from the upper or heating element portion of toaster 10.

Centrally mounted on upper front panel 12 near the upper edge thereof is an electrical switch 64, the function of which is explained hereinafter. This switch which is of the normally open kind has an operating button which is borne upon and depressed by toaster cover or lid 28 to close the switch when the lid is in its lowered or closed position.

Mounted on the right hand side of toaster 10 is an electrical switch 66 of the toggle or on-off kind, the function of which is explained hereinafter. The normal condition of this switch is simply that into which it has last been put, that is, either closed or open, or "on" or "off." The operating lever of switch 66 extends beyond the switch on two sides; that is, it may be manipulated not only from outside but also from inside of the toaster casing. When the portion of the operating lever outside the toaster casing is snapped upwardly, and the portion of it inside the casing is correspondingly depressed, switch 66 is thrown into a closed or "on" condition. Supposing that the switch is in this condition, and supposing also that solenoid 62 is energized to draw up its plunger element, the rising and swinging structure of the rotatable joint or connection between the plunger element and bell crank lever 52 will strike the depressed inner end of the operating lever of switch 66 and throw this switch into an open or "off" condition.

Mounted on the right hand side of toaster 10 quite close to switch 66 is a timing and electrical contact making device generally designated 68, the structure and function of which are explained hereinafter. This device has an externally manipulatable timing adjustment or setting knob 70.

Within the lower portion of the toaster casing defined by panels 20, 22, 24 and 26 there is withdrawably installed a toast-receiving basket generally designated 72. This basket has front, back, and side walls which are of multi-ply construction comprising inside and outside metal panels separated by a layer of a suitable thermal insulation material. The bottom structure of the toast-receiving basket comprises an upper metal panel 74 and a lower plastic or thermally insulated metal panel 76. Between these panels there is an array of electrically insulated resistance heating coils 78. The leads of these coils are brought back to a male plug 80 on the basket. This plug is adapted to make electrical connection with a female plug 82 mounted within the toaster casing when basket 72 is slid into toast-receiving position within toaster 10 as shown particularly in FIG. 3.

Attached to the outer surfaces of the side walls of basket 72 are lifting and carrying handles 84 and 86. It is by means of these handles that the toast-receiving basket may be withdrawn from the toaster. Attached to the lower, outer surface of the bottom wall or bottom structure of basket 72 are a plurality of foot elements 88 which serve as runners for the basket when it is pushed into toast-receiving position within toaster 10, and also serve to keep the warmed bottom structure of basket 72 out of direct contact with any surface such as a table top on which the basket may be placed after being withdrawn from the toaster. Attached to the inner surfaces of the side walls of basket 72 are open-topped pockets or receptacles 90 and 92. Various herbs or seasoning essences may be placed in these pockets and their scents will flavor the toast slices kept warm in the insulated receiving basket by heating coils 78 in the bottom of the basket.

Figure 3:
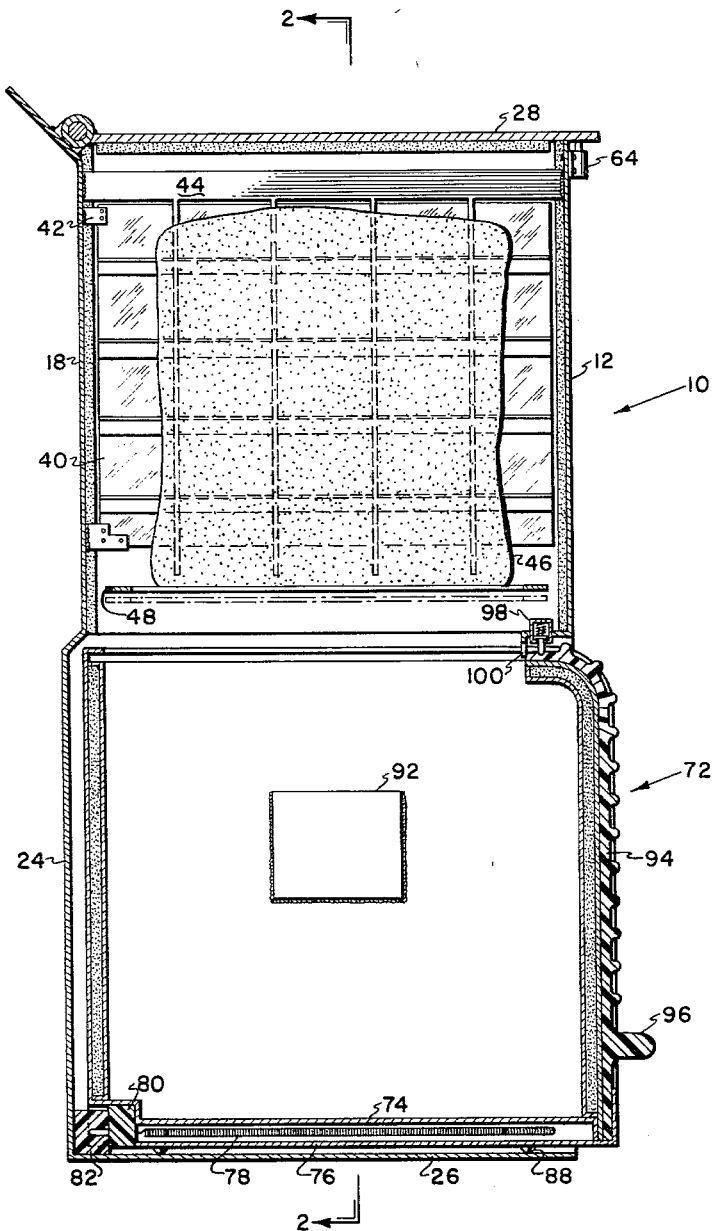
FIG. 3 represents a view in side sectional elevation of the electric toaster of FIG. 1 taken along line 3—3 in FIG. 2 looking in the direction of the arrows.
Figure 4:
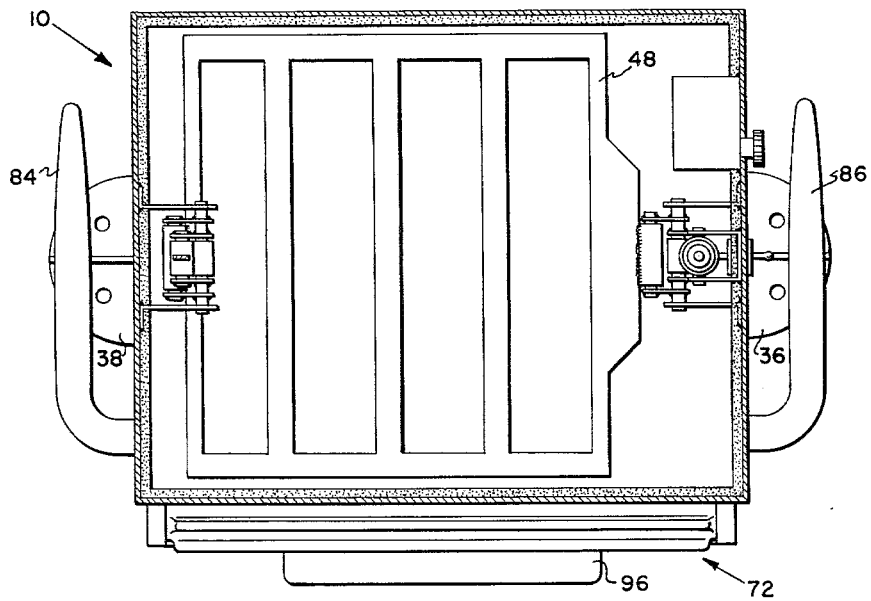
FIG. 4 represents a view in sectional plan of the electric toaster of FIG. 1 taken along line 4—4 in FIG. 2 looking in the direction of the arrows.

The lid or top cover of toast-receiving basket 72, as particularly illustrated, comprises a piece of flexible plastic material 94 to which is attached or on which is formed a knob or finger grip element 96. Basket lid 94 is slidably mounted in guideways on the inner surfaces of both of the side walls of the basket, and working in these guides it has an action similar to that of the top of a roller top desk. In the showing of FIG. 3, basket top cover 94 is fully lowered or opened, and in a depression formed in it near its upper or left hand extremity it is engaged by the plunger element of a spring-loaded detent mechanism 98 mounted on the casing of toaster 10. As basket 72 is withdrawn from the toaster, the detent mechanism will exert sufficient pull on basket cover 94 to draw it closed across the theretofore open top of the toast-receiving basket before it, the detent mechanism, is snapped free of the cover as the leading edge of the cover strikes the closed upper ends of its guideways on the side walls of the basket.

When basket 72 is brought up and inserted into the lower portion of toaster 10 with its, the basket's, top cover 94 in closed position, the leading edge of the cover will strike against the plunger element of detent mechanism 98 entering through a specially provided slot in the upper edge of the back wall of the basket. The plunger element may begin to push the basket lid along in its guideways toward lowered or open position. If, however, the detent plunger should override the leading edge of the lid now, as otherwise it necessarily must later when the trailing edge of the lid strikes the closed lower ends of its guideways, and snap into the aforementioned depression formed for it in the basket lid, positive opening drive for the lid will be provided nevertheless by a downwardly-bent tab portion 100 on the toaster casing entering the basket through the aforementioned slot in the back wall thereof, and bearing against the leading edge of the basket lid.

Figure 5:
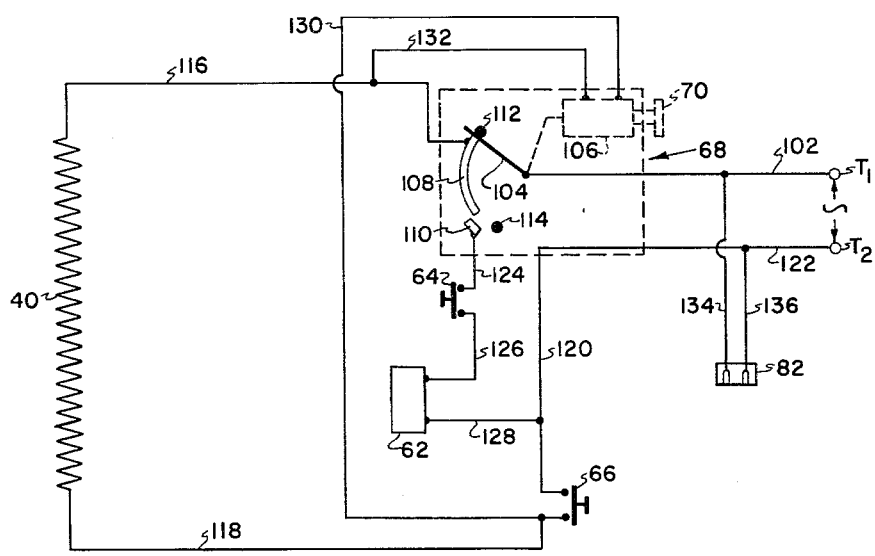
FIG. 5 represents a schematic wiring diagram of the electric toaster of FIG. 1.

Referring next to FIG. 5, $T_1$ and $T_2$ represent the external terminals or wiring connections of toaster 10, these terminals not being shown in the structural drawings, wherethrough electrical power from a suitable source may be applied to the toaster. From terminal $T_1$, internal wiring element 102 of the toaster leads to armature 104 which is part of timing and electrical contact making device 68. This armature is connected mechanically to and driven by a timing mechanism 106 within device 68 which is set or reset by knob 70. Electrically, armature 104 is connected or connectable to arcuately formed contact strips 108 and 110 which are not connected to each other. One extremity of the armature's travel is determined by post 112. When the armature is against this post it is in electrical contact with strip 108. The other extremity of the armature's travel is determined by post 114. When the armature is against this post it is out of electrical contact with either strip 108 or 110.

Strip 108 is connected to terminal $T_2$ through wire 116, heating elements 40, wire 118, manually and solenoid operated switch 66, and wires 120 and 122. Strip 110, which is considerably shorter than strip 108, is connected to terminal $T_2$ through wire 124, lid-operated switch 64, wire 126, the coil element of solenoid 62, wire 128, and wires 120 and 122. Timing mechanism 106 is of the electrically triggered kind, and is connected across heating elements 40 by wires 130 and 132 to receive electrical triggering power or pulses. Female plug 82 is connected across terminals $T_1$ and $T_2$ by wires 134 and 136 joined to wires 102 and 122, respectively.

To consider the operation of toaster 10, imagine that lid 28 is in raised position; that the operating lever of switch 66 is turned to "off"; that there is no bread in the toaster; that knob 70 is in a position showing zero time on timing and electrical contact making device 68, this corresponding to the condition of armature 104 being against post 114; that toast-receiving basket 72 is fully withdrawn from and outside of the toaster, and that terminals $T_1$ and $T_2$ are connected to a suitable source of electric power. With lid 28 raised, switch 64 is in its normally open condition.

As a first step, toast-receiving basket 72 is brought up and inserted all the way into the lower portion of the toaster casing, flavoring herbs as desired having been put in basket pockets 90 and 92. Basket lid 94 may be either open or closed initially, but if it be initially closed, either fully or partially, it will be fuy open by action of detent 98 and tab 100 as expained hereinbefore by the time that the basket has been pushed back all the way into the toaster. Just about as the basket reaches its final position in toaster 10, its male plug 80 makes electrical connection with female plug 82 in the toaster, and heating coils 78 are energized and start to warm the basket's inner bottom panel 74.

Next, slices of bread 46 are dropped down in between spacer guides 44, and come to rest on the slat portions of heating element assembly bottom cover plate 48. Next, timing adjustment knob 70 is turned to bring armature 104 onto contact strip 108 with the armature being brought all the way over against post 112 for maximum time of toasting when fully browned toast is desired. It will be noted that as armature 104 is moved away from post 114 toward contact strip 108 it necessarily passes across contact strip 110 which is wired to solenoid 62 through switch 64. At this time with switch 64 in open condition, however, touching of strip 110 by armature 104 will not cause current to flow through the solenoid coil element and so there will be no shifting of plate 48 and consequent dumping of bread slices 46 by any action of the solenoid plunger element.

Next, toaster lid 28 is closed and the operating button of switch 64 is thereby depressed to shift this switch from an open to a closed condition. Next, the operating lever of switch 66 is turned to "on." One effect of the last-described step is to complete the electrical circuit through heating elements 40. Consequently, these elements start to warm up and toasting of the bread is commenced. Another effect of it is to send triggering current to timing mechanism 106 and start this mechanism running with accompanying return rotation of knob 70 and sweep of armature 104 across contact strip 108 toward contact strip 110.

Armature 104 will run off of strip 108 and slide onto strip 110 at about the same time. The precise relative timing of these events is not critical for purposes of this invention to the extent that the armature may go out of contact with strip 108 either slightly before or slightly after it comes into contact with strip 110. When armature 104 does go out of contact with strip 108, however, the circuit through heating elements 40 is broken, and these elements begin to cool down. Correspondingly, when the armature does come into contact with strip 110 the circuit through the coil element of solenoid 62 is completed, and the solenoid plunger element is pulled upwardly. Upward movement of the plunger has the effect of shifting plate 48 rightwardly against the pull of spring 58 as aforedescribed, and removing the slat support for what are now toast slices to allow all of these slices to fall simultaneously through the slotted regions of plate 48 into toast-receiving basket 72. Upward movement of the punger element of solenoid 62 also has the effect of throwing switch 66 into an "off" condition as likewise aforedescribed.

The arcuate length of contact strip 110, while small in comparison with that of contact strip 108, is great enough that the electrical circuit through the coil element of solenoid 62 is maintained to hold heating element assembly bottom cover plate 48 in its right hand position sufficiently long to make sure that all toast slices and accompanying crumbs do have adequate opportunity to drop fully through the plate's slotted regions. When armature 104 does go out of contact with strip 110 in the course of its continued movement toward post 114, the solenoid circuit is broken; the upward magnetic pull on the solenoid plunger element is terminated, and plate 48 is restored to its left hand position shown in solid outline in FIG. 2 by the pull of tension spring 58.

Next, toast receiving basket 72 is withdrawn from toaster 10. The lid of the basket is drawn closed automatically, and the toast within the basket is maintained warm for at least a while because of the thermally insulated wall structure of the basket and the previous heating effect of electrical resistance coils 78 in the basket's bottom. Finally, toaster lid 28 is opened to allow the loading of fresh slices of bread 46 and a repetition of the toasting and toast discharging and withdrawing operation as described.

Figure 6:
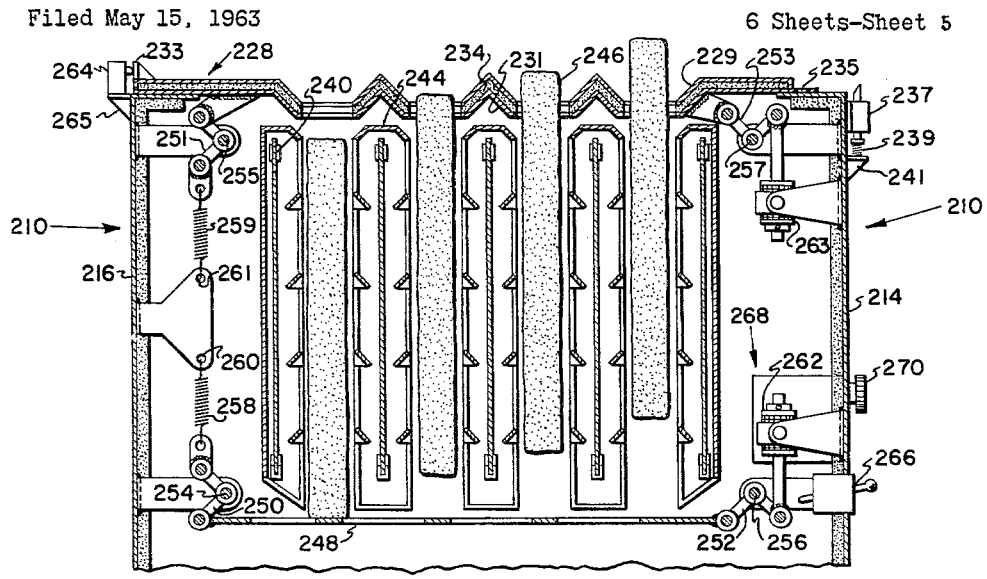
FIG. 6 represents a view in front sectional elevation of the upper or heating element portion of a second embodiment of the electric toaster of this invention, the top cover of the heating elements being in open position to allow the loading of slices of bread for toasting, and the bottom cover of the heating elements being in position to retain slices of bread in toasting position.
Figure 7:
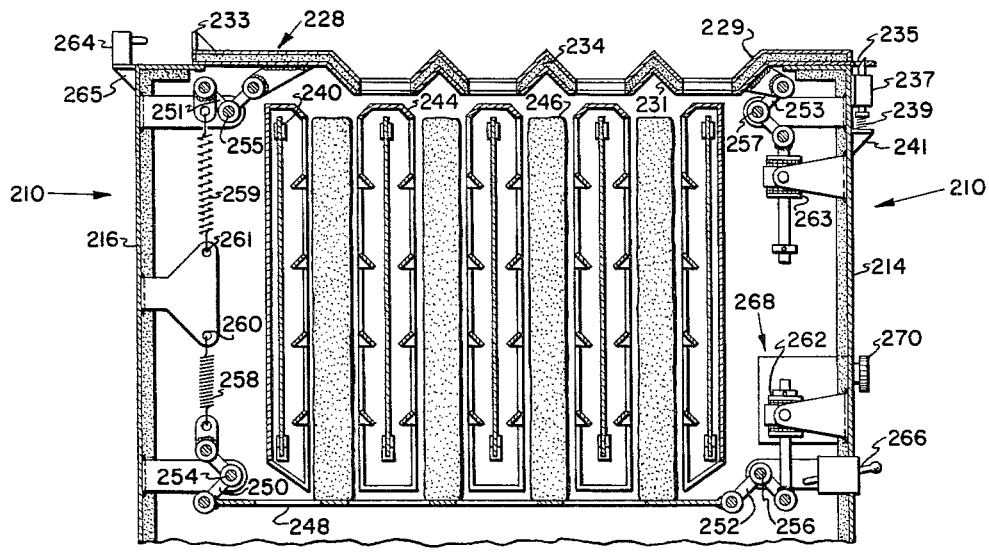
FIG. 7 represents a view similar to FIG. 6, except that the top cover of the heating elements has been shifted into closed position, this position being consistent with energization of the heating elements for toasting purposes.
Figure 8:
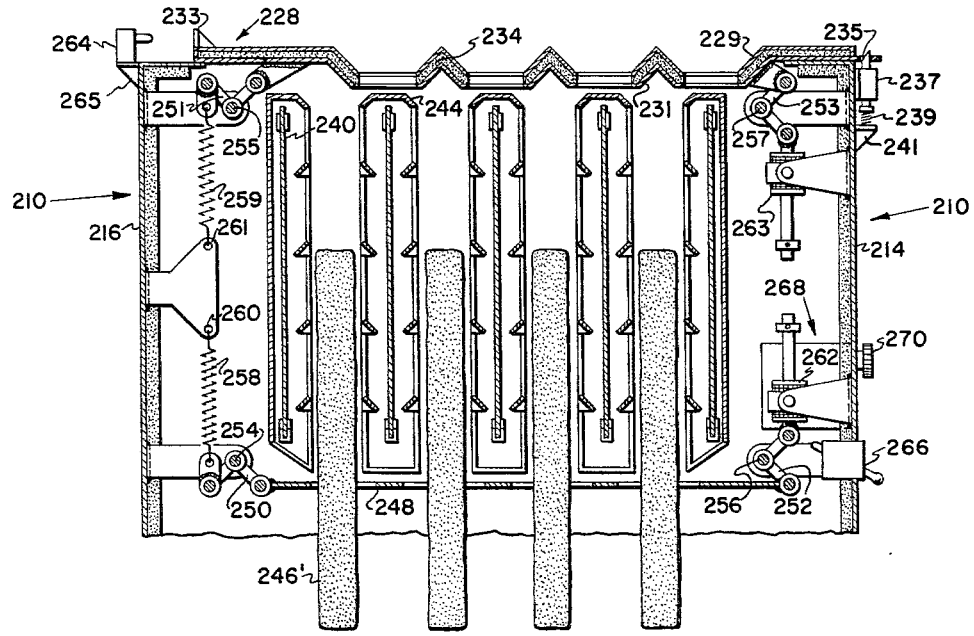
FIG. 8 represents a view similar to FIG. 7, except that the bottom cover of the heating elements has been shifted into open position to allow slices of toast to drop down from in between the heating elements.

Referring next to FIGS. 6, 7 and 8 as a group, a second embodiment of the electric toaster of this invention is generally designated 210. Only the upper portion of this toaster is shown. Its lower portion is generally similar to that of previously-described toaster 10. Electric toaster 210 has upper side panels 214 and 216, a plurality of heating elements 240, and a plurality of spacer guides 244 enclosing the heating elements. It is provided with a sidewise shiftable top cover or lid generally designated 228, the motion and means for movement of which are described and explained hereinafter, which is appropriately slotted to allow passage through it into the toaster of slices of bread 246 for toasting as shown in FIG. 6. In its two positions shown respectively in FIG. 6 on the one hand and FIGS. 7 and 8 on the other, lid 228 is seated snugly on inturned flange portions at the upper ends of side panels 214 and 216. These side panels are internally insulated with suitable sheet-like material such as asbestos sheet.

Lid 228 is of three-ply construction comprising an outside panel 229, an inside panel 231, and a center sheet or layer of insulation material 234. At its left hand end, toaster lid 228 has an up-turned flange or tab 233 which is adapted to bear upon the operating button of switch 264 which is mounted on side panel 216 by means of bracket 265. This switch is of the normally closed kind, and has a function which is explained hereinafter. In its central and major extent, lid 228 is formed to a series of peaks in between its slot regions. When the lid is in bread toasting position as shown in FIG. 7, these peaks are located directly above the bread slices, and the peaked surfaces of inside panel 231 of the lid which may be bright polished surfaces act to concentrate and reflect heat downwardly. Near its right hand end, toaster lid 228 is characterized by a slot 235 which is shaped and sized to engage and be engaged by the beveled upper end of the plunger element of a solenoid 237 mounted on side panel 214 when the lid is in bread toasting position. This plunger element is normally urged upwardly by a compression spring 239 seated on a bracket 241 mounted on side panel 214.

While in toasting position, bread slices 246 are supported on the slat portions of a slotted plate 248 constituting a bottom cover for the plurality of heating elements or heating element assembly. Plate 248 itself is supported through rotatable connections with and from bell crank levers 250 and 252 whose pivot shafts 254 and 256 are mounted in the toaster casing. The end of lever 250 distant from the lever's connection to plate 248 is attached through a tension spring 258 to a spring post 260 mounted on and within the toaster casing. The end of lever 252 distant from the lever's connection to plate 248 is rotatably connected to the lower end of the plunger element of an electric solenoid 262, the coil element of which is rotatably mounted in the toaster casing.

When there is no current flowing in the coil element of solenoid 262, the pull of spring 258 holds slotted plate or heating element assembly bottom cover 248 in its position shown in FIG. 6, that is, with its slat portions in between spacer guides 244 to support slices of bread 246 in toasting position. When there is current flowing in the coil element of solenoid 262, that is, when the solenoid is energized, the solenoid plunger element is drawn upwardly, and slotted plate 248 is shifted to the right against the pull of spring 258, and assumes the position in which it is shown in FIG. 8. When the heating element assembly bottom cover is in this position, its slots or open regions are in between spacer guides 244, and toast or bread slices originally held in toasting position between the spacer guides on the slats of plate 248 can drop through the slots in the plate for discharge from the upper or heating element portion of toaster 210.

Toaster lid 228 is shifted from left to right and vice versa on bell crank levers 251 and 253 with which it has rotatable connections. Pivot shafts 255 and 257 of these levers are mounted in the toaster casing. The end of lever 251 distant from the lever's connection to lid 228 is attached through a tension spring 259 to a spring post 261 mounted on and within the toaster casing. The end of lever 253 distant from the lever's connection to plate 248 is connected rotatably to the upper end of the plunger element of an electric solenoid 263, the coil element of which is rotatably mounted in the toaster casing.

When there is no current flowing in the coil element of solenoid 263, the pull of spring 259 holds toaster lid 228 in its left hand position shown in FIG. 6, that is, with its slotted regions in between spacer guides 244 to allow slices of bread 246 to be dropped clearly down through them to come to rest on the slat portions of heating element assembly bottom cover plate 248. With the toaster lid in its left hand position, tab 233 on the lid depresses the operating button of switch 264 and maintains this switch in open condition. When there is current flowing in the coil element of solenoid 263, that is, when the solenoid is energized, the solenoid plunger element is drawn downwardly, and toaster lid 228 is shifted to the right against the pull of spring 259 and assumes the position in which it is shown in FIG. 7. In coming into this position, lid 228 overrides and momentarily depresses the plunger element of solenoid 237 against the force of spring 239. This plunger element is promptly snapped up again by its supporting spring, and its beveled upper end enters slot 235 in the toaster lid.

Mounted on the right hand side of toaster 210 is an electrical switch 266 of the toggle or on-off kind, the function of which is explained hereinafter. The normal condition of this switch is simply that into which it has last been put, that is, either closed or open or "on" or "off." The operating lever of switch 266 extends beyond the switch on two sides; that is, it may be manipulated not only from outside but also from inside of the toaster casing. When the portion of the operating lever outside the toaster casing is snapped upwardly, and the portion of it inside the casing is correspondingly depressed, switch 266 is thrown into a closed or "on" condition. Supposing that the switch is in this condition and supposing also that solenoid 262 is energized to draw up its plunger element, the rising and swinging structure of the rotatable joint or connection between the plunger element and bell crank lever 252 will strike the depressed inner end of the operating lever of switch 266 and throw this switch into an open or "off" condition.

Mounted on the right hand side of toaster 210 quite close to switch 266 is a timing and electrical contact making device generally designated 268, the structure and function of which are explained hereinafter. This device has an externally manipulatable timing adjustment or setting knob 270.

Figure 9:
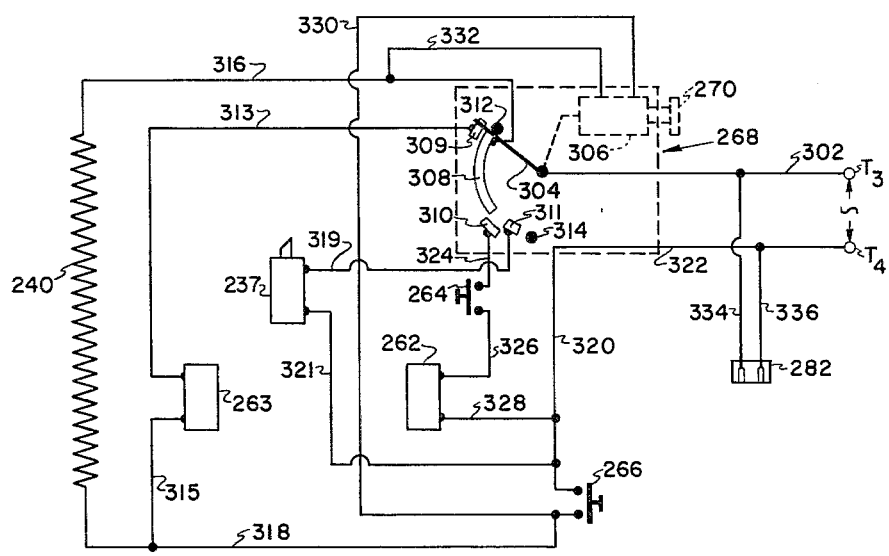
FIG. 9 represents a schematic wiring diagram of the electric toaster of FIG. 6.

Referring next to FIG. 9, $T_3$ and $T_4$ represent the external terminals or wiring connections of toaster 210, these terminals not being shown in the structural drawing, wherethrough electrical power from a suitable source may be applied to the toaster. From terminal $T_3$, internal wiring element 302 of the toaster leads to armature 304 which is part of timing and electrical contact making device 268. This armature is connected mechanically to and driven by a timing mechanism 306 within device 268 which is set or reset by knob 270. Electrically, armature 304 is connected or connectable to arcuately formed contact strips 308, 309, 310 and 311 which are not connected to each other. One extremity of the armature's travel is determined by post 312. When the armature is against this post it is in electrical contact with strips 308 and 309. The other extremity of the armature's travel is determined by post 314. When the armature is against this post it is out of electrical contact with either strip 308, 309, 310 or 311.

Strip 308 is connected to terminal $T_4$ through wire 316, heating element 240, wire 318, manually and solenoid operated switch 266, and wires 320 and 322. Strip 309, which is considerably shorter than strip 308, and indeed not necessarily much longer than the width of a contact point, is connected to terminal $T_4$ through wire 313, the coil element of solenoid 263, wire 315, wire 318, switch 266, and wires 320 and 322. Strip 310, which is considerably shorter than strip 308, is connected to terminal $T_4$ through wire 324, lid-operated switch 264, wire 326, the coil element of solenoid 262, wire 328, and wires 320 and 322. Strip 311, which is of a length comparable to that of strip 309 in short form, is connected to terminal $T_4$ through wire 319, the coil element of solenoid 237, wire 321, and wires 320 and 322. Timing mechanism 306 is of the electrically triggered kind, and is connected across heating elements 240 by wires 330 and 332 to receive electrical triggering power or pulses. Female plug 282 for the energization of a toast-receiving basket to be used with toaster 210 is connected across terminals $T_3$ and $T_4$ by wires 334 and 336 joined to wires 302 and 322, respectively.

To consider the operation of toaster 210, imagine that lid 228 is in its left hand position as shown in FIG. 6; that the operating lever of switch 266 is turned to "off"; that there is no bread in the toaster; that knob 270 is in a position showing zero time on timing and electrical contact making device 268, this corresponding to the condition of armature 304 being against post 314; that there is no toast-receiving basket in the lower portion of the toaster, and that terminals $T_3$ and $T_4$ are connected to a suitable source of electric power. With the toaster lid held to the left by the pull of spring 259, normally closed switch 264 is maintained in open condition.

As a first step, a toast-receiving basket such as or similar to basket 72 is inserted all the way into the lower portion of the toaster casing, the basket lid being opened automatically, and the male plug for the leads of the basket's bottom heating coils making electrical connection connection with female plug 282 in the toaster as this is done. Next, slices of bread 246 are dropped down through the toaster lid and in between spacer guides 244, and come to rest on the slat portions of heating element assembly bottom cover plate 248. Next, timing adjustment knob 270 is turned to bring armature 304 onto contact strips 308 and 309.

It will be noted that as armature 304 is moved away from post 314 toward contact strips 308 and 309 it necessarily passes across contact strip 311 which is wired to solenoid 237. An electrical circuit is thus momentarily completed through the coil element of this solenoid, and the plunger element of it is drawn down briefly against the force of spring 239 and then snapped back up by action of this spring. Since nothing is held on or by the plunger element of solenoid 237 at this time, however nothing will be released by the momentary depression of this element. It will be noted further that as armature 304 is moved away from post 314 toward contact strips 308 and 309 it necessarily passes across contact strip 310 which is wired to solenoid 262 through switch 264. At this time with switch 264 in open condition, however, touching of strip 310 by armature 304 will not cause current to flow through the solenoid coil element and so there will be no shifting of plate 248 and consequent dumping of bread slices 246 by any action of the solenoid plunger element.

Next, the operating lever of switch 266 is turned to "on." One effect of this step is to complete the electrical circuit through contact strip 308 and heating element 240. Consequently, these elements start to warm up and toasting of the bread is commenced. Another effect of it is to send triggering current to timing mechanism 306 and start this mechanism running with accompanying return rotation of knob 270 and sweep of armature 304 across contact strips 308 and 309 toward contact strip 310. Still another effect of turning the operating lever of switch 266 to "on" is to complete the electrical circuit through contact strip 309 and the coil element of solenoid 263. Energization of this solenoid causes toaster lid 228 to be shifted to the right into its position shown in FIG. 7 with the upper end of the plunger element of solenoid 237 projecting into slot 235 in the lid. Motion of lid 228 to the right relieves the pressure of lid tab 233 on the operating button of switch 264, and this switch snaps into its normal closed condition.

Armature 304 will run off of strip 309 quite early in the course of its, the armature's timed motion. As the armature leaves this strip the electrical circuit through the coil element of solenoid 263 will be broken. Tension spring 259 will, however, be unable to return toaster lid 228 to its left hand position shown in FIG. 6 at this time because the lid is latched in its right hand or toasting position by means of the plunger element of solenoid 237.

Later in the course of its timed motion, armature 304 will run off of strip 308 and slide onto strip 310 at about the same time. The precise relative timing of these events is not critical for purposes of this invention to the extent that the armature may go out of contact with strip 308 either slightly before or slightly after it comes into contact with strip 310. When armature 304 does go out of contact with strip 308, however, the circuit through heating elements 240 is broken, and these elements begin to cool down. Correspondingly, when the armature does come into contact with strip 310 the circuit through the coil element of solenoid 262 is completed, and the solenoid plunger element is pulled upwardly. Upward movement of the plunger has the effect of shifting plate 248 rightwardly against the pull of spring 258 as afore described, and removing the slat support for what are now toast slices 246′ to allow all of these slices to fall simultaneously through the slotted regions of plate 248 into the toast-receiving basket as shown in FIG. 8. Upward movement of the plunger element of solenoid 262 also has the effect of throwing switch 266 into an "off" condition as likewise afore described. This too is shown in FIG. 8.

The arcuate length of contact strip 310, while small in comparison with that of strip 308, is great enough that the electrical circuit through the coil element of solenoid 262 is maintained to hold heating element assembly bottom cover plate 248 in its right hand position sufficiently long to make sure that all toast slices and accompanying crumbs do have adequate opportunity to drop fully through the plate's slotted regions. When armature 304 does go out of contact with strip 310 in the course of its continued movement toward post 314, the circuit through the coil element of solenoid 262 is broken; the upward magnetic pull on the solenoid plunger element is terminated, and plate 248 is restored to its left hand position shown in FIGS. 6 and 7 by the pull of tension spring 258.

Armature 304 will run off of strip 310 and slide onto strip 311 at about the same time. The precise relative timing of these events is not critical for purposes of this invention to the extent that the armature may be out of contact with strip 310 either slightly before or slightly after is comes into contact with strip 311. When armature 304 does come into contact with strip 311, however, the circuit through the coil element of solenoid 237 is completed, and the solenoid plunger element is pulled down against the force of compression spring 239. Momentary depression of the plunger element with accompanying removal of its beveled upper end from slot 235 in toaster lid 228 has the effect of unlatching this lid. Upon being unlatched, the lid is shifted back to its left hand or bread loading position shown in FIG. 6 by the pull of tension spring 259. When armature 304 runs off of strip 311 to come to rest finally against post 314, the circuit of solenoid 237 is broken, and the plunger element of this solenoid is snapped back upwardly into latching position by the action of spring 239.

Next, the toast-receiving basket is withdrawn from toaster 210. The lid of the basket is drawn closed automatically, and the toast within the basket is maintained warm for at least a while because of the thermally insulated wall structure of the basket and the previous heating effect of the electrical resistance coils in the basket's bottom. The toaster itself is in condition to receive fresh slices of bread 246 for toasting because both toaster lid or heating element assembly top cover plate 228 and heating element assembly bottom cover plate 248 are in their left hand positions as shown in FIG. 6 to place the slots in plate 228 directly above the slats of plate 248 with both these slots and these slats being in between spacer guides 244 enclosing the toaster's heating elements 240.

Protection by Letters Patent of this invention in all its aspects as the same are defined in the appended claims is sought to the greatest extent that the prior art allows. It is to be understood in particular that whereas toasters 10 and 210 constituting first and second apparatus embodiments of the present invention have each been illustrated as having a capacity of four slices of bread for toasting, either one or both of them may be constructed with as great a bread slice capacity as practicably desirable. While slices of bread for toasting in any given batch may be loaded into the toaster of this invention one at a time as suggested by FIG. 6, all of them are discharged simultaneously in toasted condition as shown clearly in FIG. 8. An incidental but nevertheless significant advantage of the toaster of this invention is that with its bottom discharge feature there is scant opportunity for bread or toast crumbs to accumulate within the toaster.

What is claimed is:

1. An electric toaster comprising (1) a casing having an upper inlet opening for the loading of slices of bread into said toaster and a lower outlet opening for the withdrawing of slices of toast from said toaster, (2) a plurality of heating elements within said casing in such space relation one with another to accommodate slices of bread in vertical orientation between adjacent elements, said slices being loaded between said elements through the inlet opening in said casing, (3) a bottom cover plate for said heating elements, said plate being sidewisedly shiftably mounted within said casing and further being characterized by a plurality of slotted regions separated by a plurality of slat portions, said slat portions being disposed to support slices of bread in toasting position between said heating elements in one position of sidewise shifting of said bottom cover plate and said slotted regions being disposed to allow slices of toast to drop through them from between said heating elements toward the outlet opening in said casing in another position of sidewise shifting of said bottom cover plate, (4) a pair of pivotally mounted bell crank lever means, each of said bell crank lever means having an arm connected to a respective end of said bottom cover plate, (5) spring biasing means connected between said casing and one of said pair of bell crank lever means, and (6) means connected between said casing and the other of said pair of bell crank means for sidewisedly shifting said bottom cover plate against the force of said spring biasing means into said another position of sidewise shifting.

2. An electric toaster according to claim 1 wherein said sidewisedly shifting means comprises an electric solenoid operating means whereby said bottom cover plate may be shifted against the force of said spring biasing means into its position in which its slotted regions are disposed to allow slices of toast to drop through them from between said heating elements toward the lower outlet opening of said casing.

3. An electric toaster according to claim 2 which further comprises an electrical system including a timing and electrical contact making device whereby an electrical circuit may be completed through said heating elements for a determinate toasting period and subsequently an electrical circuit completed through the coil element of said electric solenoid operating means for a determinate toast discharging period.

4. An electrical toaster according to claim 3 which further comprises a lid hinged to said casing at the upper inlet opening therein and in which said electrical system further includes a normally open switch in the particular portion of said system wherethrough electrical power is supplied to the coil element of said electric solenoid operating means, said switch being so mounted that its operating button is disposed to be borne upon by said lid when said lid is closed across the upper inlet opening in said casing and said switch resultingly be put in closed condition.

5. An electric toaster according to claim 3 in which said electrical system further includes a plug whereto electrical connection may be made by a mating plug on an electrically heated toast-receiving basket cooperable with said toaster.

6. An electric toaster according to claim 3 in which said electrical system further includes an on-off switch in the particular portion of said system wherethrough electrical power is supplied to said heating element, said switch being so mounted that when it is in the "on" condition its operating lever is disposed to be struck by action of said electric solenoid operating means in the course of this means shifting said bottom cover plate for said heating elements against the force of said spring biasing means and said switch resultingly be thrown into the "off" condition.

7. An electric toaster according to claim 6 in which said timing and electrical contact making device is of the electrically triggered kind, and in which an electrical circuit may be completed wherethrough triggering power is supplied to said device upon said on-off switch being thrown into the "on" condition.

8. In the separable combination of (1) an electric toaster comprising (i) a casing having an upper inlet opening for the loading of slices of bread into said toaster and a lower outlet opening for the withdrawing of slices of toast from said toaster, (ii) a plurality of heating elements within said casing in such spaced relation one with another to accommodate slices of bread in vertical orientation between adjacent heating elements, said slices being loaded between said elements through the inlet opening in said casing, and (iii) a bottom cover plate for said heating elements, said plate being movably mounted in said casing to support slices of bread in toasting position between said heating elements in one of its, the bottom cover plate's, positions, and allow slices of toast to drop from between said heating elements toward the outlet opening of said casing in another of its, the bottom cover plate's, positions, the lower outlet opening in said casing being in a vertical plane extending below said bottom cover plate when said plate is in position to support slices of toast between said heating elements, and having a width approximately equal to at least the width of said plurality of heating elements measured normally to the cut surfaces of slices of bread between adjacent elements and a height approximately equal to at least that of said plurality of heating elements, and (2) a toast-receiving basket sized and shaped to be withdrawably insertable into said casing through the lower outlet opening therein with a fairly close fit in this opening, said basket having a movable lid, the improvement comprising means on said toaster and cooperable means on the lid of said basket whereby said lid is automatically moved into open attitude when said basket is inserted through said lower outlet opening into receiving position in said toaster below said bottom cover plate for said heating elements and automatically moved into closed attitude when said basket is withdrawn from said toaster.

9. In the combination as set forth in claim 8 wherein said toast-receiving basket further comprises at least one receptacle on the inner surface of said basket adapted to receive materials for seasoning toast.

10. The improvement according to claim 9 wherein said movable lid is a flexible and slidably openable and closeable lid member.

11. The improvement according to claim 9 wherein said toast receiving basket further includes an electrical resistance heating means in its bottom structure.

12. An electric toaster comprising (1) a casing having an upper inlet opening for the loading of slices of bread into said toaster and a lower outlet opening for the withdrawing of slices of toast from said toaster, (2) a plurality of heating elements within said casing in such spaced relation one with another to accommodate slices of bread in vertical orientation between adjacent elements, said slices being loaded between said elements through the inlet opening in said casing, (3) a bottom cover plate for said heating elements, (4) a pair of pivotally mounted bell crank lever means, each of said bell crank lever means having an arm connected to a respective end of said bottom cover plate, (5) spring biasing means connected between said casing and one of said pair of bell crank lever means, (6) means connected between said casing and the other of said pair of bell crank lever means for moving said bottom cover plate against the force of said spring biasing means whereby said plate is movably mounted in said casing to support slices of bread in toasting position between said heating elements in one of its, the bottom cover plate's, positions and allow slices of toast to drop from between said heating elements in another of its, the bottom cover plate's, positions, and (7) a top cover structure for said heating elements, said top cover structure being sidewisedly shiftably mounted on said casing above said upper inlet opening therein and further being characterized by a plurality of slotted regions separated by a plurality of substantially solid portions, said slotted regions being disposed to allow slices of bread to be dropped through them and through the upper inlet opening in said casing into toasting position between said heating elements in one position of sidewise shifting of said top cover structure and said substantially solid portions being disposed directly above slices of bread in toasting position between said heating elements in another position of sidewise shifting of said top cover structure.

13. An electric toaster according to claim 12 which further comprises latching means for said top cover structure to retain said structure in its position in which its substantially solid portions are disposed directly above slices of bread in toasting position between said heating elements, said latching means being maintained normally in an attitude to engage said top cover structure and including an electric solenoid coil element which upon being supplied with electric power is adapted to shift said latching means out of engagement with said top cover structure.

14. An electric toaster comprising (1) a casing having an upper inlet opening for the loading of slices of bread into said toaster and a lower outlet opening for the withdrawing of slices of toast from said toaster, (2) a plurality of heating elements within said casing in such spaced relation one with another to accommodate slices of bread in vertical orientation between adjacent elements, said slices being loaded through the inlet opening in said casing, (3) a bottom cover plate for said heating elements, said plate being sidewisedly shiftably mounted within said casing and further being characterized by a plurality of slotted regions separated by a plurality of slat portions, said slat portions being disposed to support slices of bread between said heating elements in one position of sidewise shifting of said bottom cover plate and said slotted regions being disposed to allow slices of toast to drop through them from between said heating elements toward the outlet opening in said casing in another position of sidewise shifting of said bottom cover plate, (4) a pair of pivotally mounted bell crank lever means, each of said bell crank lever means having an arm connected to a respective end of said bottom cover plate, (5) first spring biasing means connected between said casing and one of said pair of bell crank lever means whereby said bottom cover plate is maintained normally in its position of sidewise shifting in which its slat portions are disposed to support slices of bread between said heating elements, (6) first electric solenoid operating means connected between said casing and the other of said pair of bell crank lever means whereby said bottom cover plate may be shifted against the force of said first spring biasing means into its position in which its slotted regions are disposed to allow slices of toast to drop through them from between said heating elements toward the lower outlet opening of said casing, (7) a top cover structure for said heating elements, said top cover structure being sidewisedly shiftably mounted on said casing above said upper inlet opening therein and further being characterized by a plurality of slotted regions separated by a plurality of substantially solid portions, said slotted regions being disposed to allow slices of bread to be dropped through them and through the upper inlet opening in said casing into toasting position between said heating elements in one position of sidewise shifting of said top cover structure and said substantially solid portions being disposed directly above slices of bread in toasting position in another position of sidewise shifting of said top cover structure, (8) second spring biasing means connected between said casing and said top cover structure for said heating elements whereby said top cover structure is maintained normally in its position of sidewise shifting in which its slotted regions are disposed to allow slices of bread to be dropped through them and through the upper inlet opening in said casing into toasting position between said heating elements, (9) second electric solenoid operating means connected between said casing and said top cover structure for said heating elements whereby said top cover structure may be shifted against the force of said second spring biasing means into its position in which its substantially solid portions are disposed directly above slices of bread in toasting position between said heating elements, (10) latching means for said top cover structure to retain said structure in its position in which its substantially solid portions are disposed directly above slices of bread in toasting position between said heating elements, said latching means being maintained normally in an attitude to engage said top cover structure and including an electric solenoid coil element which upon being supplied with electric power is adapted to shift said latching means out of engagement with said top cover structure, and (11) an electrical system including a timing and electrical contact making device whereby an electrical circuit may be completed through said heating elements for a determinate toasting period and substantially concurrently an electrical circuit completed through the coil element of said second electric solenoid operating means for at least long enough for this operating means to shift said top cover structure against the force of said second spring biasing means from its position in which its slotted regions are disposed to allow slices of bread to be dropped through them and through the upper inlet opening in said casing into toasting position between said heating elements to its position in which its substantially solid portions are disposed directly above slices of bread in toasting position between said elements and hold it in this position while said latching means is effecting engagement with it, and subsequently electrical circuits completed through the coil element of said second electric solenoid operating means for a determinate toast discharging period and through the solenoid coil element of said latching means for at least long enough to shift said latching means out of engagement with said top cover structure.

15. An electric toaster according to claim 14 in which said electrical system further includes a normally closed switch in the particular portion of said system wherethrough electrical power is supplied to the coil element of said first electric solenoid operating means, said switch being so mounted that its operating button may be borne upon by said top cover structure when said structure is in its position of sidewise shifting in which its slotted regions are disposed to allow slices of bread to be dropped through them and through the upper inlet opening in said casing into toasting position between said heating elements and said switch resultingly be put in open condition.

16. An electric toaster comprising (1) a casing having an upper inlet opening for the loading of slices of toast into said toaster and a lower outlet opening for the withdrawing of slices of toast from said toaster, (2) a plurality of heating elements within said casing, (3) a plurality of spacer guides within said casing, each spacer guide enclosing a heating element and having horizontal structural elements of its own which slope inwardly and downwardly toward the enclosed heating element as heat deflectors, and said spacer guides being in such spaced relation one with another to accommodate slices of bread in vertical orientation between adjacent guides, said slices being loaded between said guides through the inlet opening in said casing, (4) a bottom cover plate for said heating elements, (5) a pair of pivotally mounted bell crank lever means, each of said bell crank lever means having an arm connected to a respective end of said bottom cover plate, (6) spring biasing means connected between said casing and one of said pair of bell crank lever means, and (7) means connected between said casing and the other of said pair of bell crank lever means for moving said bottom cover plate against the force of said spring biasing means whereby said plate is movably mounted in said casing to support slices of bread in toasting position between said spacer guides in one of its, the bottom cover plate's, positions and allow slices of toast to drop from between said guides toward the outlet opening in said casing in another of its, the bottom cover plate's, positions.

17. An electric toaster comprising (1) a casing having an upper inlet opening for the loading of slices of bread into said toaster and a lower outlet opening for the withdrawing of slices of toast from said toaster, (2) a plurality of heating elements within said casing in such spaced relation one with another to accommodate slices of bread in vertical orientation between adjacent elements, said slices being loaded through the inlet opening in said casing, (3) a bottom cover plate for said heating elements, (4) a pair of pivotally mounted bell crank lever means, each of said bell crank lever means having an arm connected to a respective end of said bottom cover plate, (5) spring biasing means connected between said casing and one of said pair of bell crank lever means, (6) means connected between said casing and the other of said pair of bell crank lever means for moving said bottom cover plate against the force of said spring biasing means whereby said plate is movably mounted in said casing to support slices of bread in toasting position between said heating elements in one of its, the bottom cover plate's, positions and allow slices of toast to drop from between said heating elements in another of its, the bottom cover plate's, positions, and (7) a top cover structure for said heating elements, said top cover structure being movably mounted on said casing above the inlet opening therein to allow slices of bread to be dropped through said inlet opening into toasting position between said heating elements in one of its, the top cover structure's, positions and substantially fully cover any toasting slices in another of its, the top cover structure's, positions, the portions of said top cover structure whereby such covering of toasting slices is effected being of peaked configuration and having internal surfaces of a nature to concentrate and reflect heat downwardly.

18. An electric toaster comprising (1) a casing having a movable cover to facilitate the loading of slices of bread into said toaster through an upper inlet opening and a lower outlet opening for the withdrawing of slices of toast from said toaster, (2) a plurality of heating elements within said casing in such spaced relation one with another to accommodate slices of bread in vertical orientation between adjacent elements, said slices being loaded between said elements through the inlet opening in said casing, (3) a bottom cover plate for said heating elements, said plate being sidewisedly shiftably mounted within said casing and further being characterized by a plurality of slotted regions separated by a plurality of slat portions, said slat portions being disposed to support slices of bread in toasting position between said heating elements in one position of sidewise shifting of said bottom cover plate and said slotted regions being disposed to allow slices of toast to drop through them from between said heating elements toward the outlet opening in said casing in another position of sidewise shifting of said bottom cover plate, (4) a pair of pivotally mounted bell crank lever means, each of said bell crank lever means having an arm connected to a respective end of said bottom cover plate, (5) spring biasing means connected between said casing and one of said pair of bell crank lever means, and (6) means connected between said casing and the other of said pair of bell crank means for sidewisedly shifting said bottom cover plate against the force of said spring biasing means into said another position of sidewise shifting.

References Cited by the Examiner

UNITED STATES PATENTS

| | | | |
|---|---|---|---|
| 441,557 | 11/1890 | Heydt | 312—31 |
| 1,083,104 | 12/1913 | Johnson | 312—31 |
| 1,555,321 | 9/1925 | Woodson. | |
| 1,739,155 | 12/1929 | Lincoln | 99—391 X |
| 1,841,301 | 1/1932 | Schroeder et al. | 99—391 X |
| 2,414,139 | 1/1947 | Cherry | 99—334 |
| 2,425,199 | 8/1947 | Navon | 99—440 |
| 2,465,577 | 3/1949 | Cox | 99—389 X |
| 2,478,253 | 8/1949 | Doner | 99—385 X |
| 2,644,392 | 7/1953 | Foster | 99—391 X |
| 2,651,703 | 9/1953 | Atkins. | |
| 2,739,730 | 3/1956 | Jonas | 312—297 X |
| 2,943,428 | 7/1960 | Stroop | 221—93 X |

CHARLES A. WILLMUTH, *Primary Examiner.*

ROBERT E. PULFREY, *Examiner.*

STUART E. BECK, *Assistant Examiner.*

UNITED STATES PATENT OFFICE
CERTIFICATE OF CORRECTION

Patent No. 3,229,613                          January 18, 1966

Berard Matzenauer

It is hereby certified that error appears in the above numbered patent requiring correction and that the said Letters Patent should read as corrected below.

Column 3, line 17, strike out "slotted"; line 19, before "portions" insert -- slat --; column 5, line 31, for "fuy" read -- fully --.

Signed and sealed this 13th day of December 1966.

(SEAL)
Attest:

ERNEST W. SWIDER
Attesting Officer

EDWARD J. BRENNER
Commissioner of Patents